United States Patent
Donini

[15] 3,674,865

[45] July 4, 1972

[54] PROCEDURE FOR OBTAINING PITUITARY GONADOTROPIC HORMONES FROM URINE

[72] Inventor: Pietro Donini, Rome, Italy

[73] Assignee: Istituto Farmacologico Serono S.p.A., Rome, Italy

[22] Filed: May 11, 1970

[21] Appl. No.: 36,484

Related U.S. Application Data

[63] Continuation-in-part of Ser. No. 614,749, Feb. 8, 1967, abandoned, which is a continuation-in-part of Ser. No. 285,489, June 4, 1963, abandoned.

[30] Foreign Application Priority Data

March 11, 1963 Italy....................................8378 A/63

[52] U.S. Cl...............................................................424/99

[51] Int. Cl..........................................................A61k 17/08

[58] Field of Search.............................................424/100, 99

[56] References Cited

UNITED STATES PATENTS 3,457,346 7/1969 Van Hell...................................424/99

*Primary Examiner*—Sam Rosen

*Attorney*—Cushman, Darby & Cushman

[57] ABSTRACT

A method for the preparation of a urinary gonadotropic hormone preparation containing FSH and LH hormones, the weight ratio of FSH:LH being at least 3:1 by extracting said hormones from menopausal or post-menopausal urine.

8 Claims, No Drawings

PROCEDURE FOR OBTAINING PITUITARY GONADOTROPIC HORMONES FROM URINE

This application is a continuation-in-part of my application Ser. No. 614,749, filed Feb. 8, 1967, which in turn is a continuation of my application Ser. No. 285,489, filed June 4, 1963 and both now abandoned.

This invention relates to a method for producing a urinary gonadotropic hormone preparation and more particularly to such a hormone preparation containing FSH and LH hormones wherein the weight ratio of FSH:LH ranges between 3:1 and 6:1.

Heretofore various preparations exhibiting gonadotropic activity were the result of research from which it was concluded that human and superior animals' hypophysis elaborate and secrete two gonadotropic factors, each having an activity distinct from the other. One of these factors is designated FSH (follicle stimulating hormone) and the other is termed ICSH or LH factor (interstitial cell stimulating hormone or luteinizing hormone).

Four different types of products having gonadotropic activity are presently in production. They are (1) the gonadotropic chorionic hormone which is extracted from the urine of pregnant women and which biologically corresponds to the LH factor; (2) serum gonadotropic hormone which is extracted from pregnant mare serum and which biologically corresponds to both the FSH and LH factors; (3) pituitary gonadotropic hormone which is extracted from the hypophysis of such animals as sheep, horses and pigs and which biologically exhibits both FSH or LH factors; and (4) gonadotropic hormones which are extracted from the urine of women in the menopausal stage and which biologically correspond to FSH and LH factors together. The process for extracting and purifying these latter hormones, hereinafter referred to as HMG (human menopausal gonadotropin) is disclosed in my U.S. application Ser. No. 63,980, filed Oct. 21, 1960 and now abandoned.

All of the above-mentioned products with gonadotropic activity present, more or less, rather serious inconveniences. In fact, the biological effect of the chorionic gonadotropic hormone (HCG or human chorionic gonadotropin) is exclusively that of the LH type and therefore such a hormone is obviously only useful where FSH type activity is unnecessary. Further, it is known that both the serum or pituitary gonadotropins, i.e. those which are not of human origin, have the capacity of provoking, after a treatment of repeated injections to humans during a certain period of time, the formation of specific antibodies or anti-hormones capable of inhibiting the action of successive administration of the same hormone.

The gonadotropic hormone, as extracted from post-menopausal urine and which was the subject of our preceding patent, notwithstanding its good therepeutical effect, also contains impurities which limits its therepeutic usefulness, especially in those cases where considerable hormone dosages are required. The said HMG is so impure that it certainly cannot be utilized as an eventual model of chemical structure for the study of a synthesis of the molecule of the pituitary gonadotropic hormone or hormones. For the same reason (that is because of the excessive quantity of impurities), the said HMG cannot be used for the eventual immunological study of gonadotropins, which aims at clarifying the problems concerning the qualitative and quantitative determination of the FSH and LH factors in human liquids (i.e. plasma, serum, urine, etc.).

It is therefore an object of the present invention to provide a procedure which, starting from an easily available material, provides a human urinary gonadotropic hypophyseal hormone with predominant FSH activity and with LH activity, which hormone is devoid of antigen properties when injected into humans, and is capable of (a) stimulating the human ovaries (as has been shown by various authors) and (b) provoking ovulation and pregnancy in cases of primary or secondary amenorrhoea of long duration caused by insufficient pituitary gonadotropins.

Such a preparation, because of its high level of purity, can also be used for studying the structure of the molecule or molecules constituting human gonadotropic hormones. This study can lead to the possibility of a complete synthesis or of the transformation of certain peptic chains of animal pituitary gonadotropins for the purpose of making the latter similar, or structurally equal, to human pituitary gonadotropins. Finally, the hormone preparation of this invention can be useful for the preparation of the necessary ingredients for the immunological qualitative and quantitative determination of FSH and LH in human liquids as plasma, serums, urine, etc., (antiserum of rabbits, sheep, horses or other suitable animals and, as necessary, ingredient for coating corpuscles of humans or of rams or other similar kinds, either for the coating of latex particles or other organic or inorganic matter suitable for the purpose).

A further object of this invention is both to modify and complete the preparation procedure described in my aforesaid patent application, as well as to define with precision the sequence of operations required for the extraction and purification of HMG.

A still further object of this invention is the provision of a process for the preparation of pituitary gonadotropic hormones extracted from menopausal and post-menopausal urine.

In accordance with the present invention, the urinary gonadotropic hormone preparation can be prepared by acidifying menopausal or post-menopausal human urine to a pH between 4.0 and 4.5; adding thereto an aqueous suspension of an adsorbent comprising 10 to 30, preferably about 20 weight percent activated kaolin; agitating the resulting mixture preferably for a period of about 30 minutes to 1 hr., and more preferably for about 1 hour; separating the activated kaolin adsorbent from said mixture by any convenient separation means such as settling, decantation of the supernatant liquid, centrifugation, filtration or the like; discarding the supernatant liquid; centrifuging the separated activated kaolin adsorbent; washing the centrifuged or separated activated kaolin adsorbent twice with aciduated water at a pH of about 4.0 to 4.8, preferably about 4.5; eluting the washed activated kaolin adsorbent, preferably about twice, with 0.9 to 1.1 M, preferably 1 M aqueous ammonia solution so as to obtain an eluate at a pH between 11.0 and 11.3; mixing the resulting eluates; adjusting the pH of the mixed eluates to about 8.3–8.7, preferably about 8.5, thereby forming a precipitate; separating the said precipitate from the mixed eluates to provide a relatively clear liquid; acidifying said relatively clear liquid to a pH of about 5.0 to 5.5; adding to the acidified clear liquid sufficient acetone, generally about 2 volumes of the same, to produce a precipitate if desired or convenient and permitting the mixture to stand for a period of about 12 to 24 hours to form said precipitate; separating the resulting precipitate from the acetone treated clear liquid; drying the precipitate; washing the precipitate with ethanol, generally about 95 percent ethanol, and ether; extracting the washed precipitate with about 70 percent ethanol containing about 10 percent ammonium acetate to obtain a relatively clear extract; adding to the resulting extract absolute ethanol containing about 10 percent ammonium acetate to produce a precipitate; dissolving said precipitate with a 0.05 M phosphate buffer at a pH of about 7; stirring or agitating the dissolved precipitate with diethylaminoethyl cellulose to form a relatively clear filtrate; acidifying the relatively clear filtrate to a pH of 5.4; passing said acidified relatively clear filtrate through a column containing synthetic alumino-silicate gel equilibrated with 0.05 M acetate buffer at a pH of about 5.4; eluting the column with 40 percent ethanol containing 10 percent ammonium acetate to provide an eluate; adding to said eluate about 95 percent ethanol in amounts sufficient to form a precipitate; and washing the precipitate to provide a urinary gonadotropic hormone preparation containing FSH and LH hormones, the ratio of FSH:LH being between 3:1 and 6:1.

The following examples serve to illustrate the invention.

EXAMPLE 1

Menopausal or post-menopausal urine, after being added to a sufficient amount of glacial acetic acid to adjust pH thereof between 4.0 and 4.5, is stirred with a watery suspension of an activated adsorbent such as a 20 percent aqueous suspension of activated kaolin.

The activated adsorbent is then separated, washed with water acidified to a pH of 4.5 with acetic acid. Thereafter the washed activated kaolin is eluted with an aqueous ammonia solution to provide an eluate at a pH between 11 and 11.3 inclusive. The pH of the eluate is adjusted to about 8.3–8.7 by means of acetic acid, thereby forming a precipitate which is subsequently separated from the remainder to recover a relatively clear liquid to which is added acetic acid until a pH between 5 and 5.5 is reached. To the thus acidified clear liquid there is added sufficient acetone to produce a precipitate which is then filtered off and dried. The raw precipitate thus obtained is washed with 95 percent ethanol and with ether and then extracted with 70 percent ethanol containing 10 percent ammonium acetate to obtain a relatively clear extract. Absolute ethanol containing 10 percent ammonium acetate is added to the thus obtained relatively clear extract to produce a precipitate which is then washed with 95 percent ethanol and with ether.

The washed precipitate is dissolved with a 0.05 M phosphate buffer at pH 7 and then stirred with diethylaminoethyl-cellulose to produce a clear filtrate which is then acidified to pH 5.4 with glacial acetic acid. The acidified clear filtrate is then passed through a column containing synthetic alumino-silicate gel previously treated with 1 N ammonia and then with 1 N acetic acid and then with water and finally equilibrated with 0.05 M acetate buffer at pH 5.4. After adsorption of HMG on the alumino-silicate gel, the column is washed with 0.05 M acetate buffer at pH 5.4 until the optical density of the effluent, $E280^{\mu}$, is near zero. The HMG is then eluted with 40 percent ethanol containing 10 percent ammonium acetate. The eluted alcohol product is precipitated with 95 percent ethanol, centrifuged and then washed with absolute ethanol and then with ether, and dried. To obtain even purer HMG, it is dissolved with distilled water and strained through a column prepared with Sephadex G 200 which comprises small grains of a hydrophilic insoluble material made by cross-linking polysaccharide dextran suspended in distilled water. In this insoluble material the dextran chains are cross-linked to give a three dimentional network and the functional ionic groups are attached to the glucose units of the polysaccharide chains by ether linkages. The first fractions of the outflow are collected and then lyophilized. These filtrations on Sephadex gel are made at a temperature of 4°– 5° C.

For the extraction of gonadotropic hormones according to the method of this invention, the menopausal or post-menopausal urine is collected in glass or plastic vessels containing glacial acetic acid in quantities sufficient to impart to the urine a pH between 4 and 4.5 and thereby inhibit germ growth.

The term active kaolin means a kaolin previously washed with a normal solution of hydrochloric acid and left to stand until materials separate into layers. Thereafter the floating liquid is decanted and the kaolin is washed repeatedly with water to remove residual hydrochloric acid.

The diethylaminoethyl-cellulose is previously treated with 0.5 N hydrochloric acid, thereafter with 0.5 N sodium hydroxide and then with 0.05 M phosphate buffer at pH 7.

The synthetic alumino-silicate gel utilized in this invention must be previously treated to correspond to a determined granulation (the fraction is selected which passes through a 56 mesh (per linear inch) sieve and retained by a 76 mesh sieve) and is then washed with acetic acid by decantation. Thereafter the particles are then washed with water and dried.

It is understood that in the chromatographic purification of the extract on synthetic alumino-silicate gel, the ammonium acetate concentration and the degree of ethyl alcohol indicated for HMG elution, are no more than their approximate values, and one can, if desired, increase or decrease the same within certain limits.

The procedure of this invention provides gonadotropic hormones with prevalent FSH effect, having the following biological activities:

Total gonadotropic Activity (mouse uterus test)
1 mg= 141 mg equivalent of I.R.P.
FSH (Augmentation test in rats)
1 mg= 621 mg equivalent of I.R.P.
LH (Ventral prostate wt. Hypophysectomized rats)
1 mg= 115 mg equivalent of I.R.P.

The biological effects have been determined accordinG to the methods and expressed in terms of 1st I.R.P. – HMG (international reference preparation of human menopausal gonadotropin) as explained hereunder:

The total gonadotropic effect has been determined according to the method described by Loraine, J.A., Brown, J.B., J. Endocrinol. 18:77, 1959.

The FHS effect has been determined according to the method described by Steelman, S.L., Pohley, Florence M., Endocrinology 53:604, 1953.

The LH effect has been determined according to the method described by Loraine, J.A., Brown, J.B., Acta Endocrin. 17:520, 1954.

The results of the biological determinations are calculated according to Gaddum J.H.,J.Pharm. Lond. 6:345, 1953 and Borth, R., Diczfalusy, E., Heinrichs, H.D., Arch. fur Gynakol. 188:497, 1957.

EXAMPLE 2

A 1,083 liter pool of post-menopausal urine was adjusted with glacial acetic acid to pH 4.5 and was stirred for about an hour with 5,414 gr of diatomaceous earth (Celite) and 54.15 liters of a 20 percent kaolin suspension. The kaolin and diatomaceous earth are left to settle overnight at room temperature. The clear natant is discarded and the kaolin plus diatomaceous earth is centrifuged. The precipitate is washed twice with water at pH 4.5 acidified with acetic acid and then eluted twice with 1M aqueous ammonia in order that the pH of the eluate is adjusted to between 11 and 11.3. The mixed eluates are brought to pH 8.5 with acetic acid and after separation by centrifugation of the formed precipitate, the resulting clear liquid is acidified to pH 5–5.5 with glacial acetic acid. Thereafter 2 volumes of acetone are added thereto to produce a precipitate which is left to settle overnight. Subsequently, the resulting clear natant is discarded and the precipitate is washed with acetone by decantation and is then put into a Buchner filter and washed with 95 percent ethanol and with ethyl ether. Finally, the precipitate is dried over anhydrous calcium chloride under reduced pressure.

The raw kaolin-acetone yield (Fraction A) is 83.88 gr.

Fraction A (83.85 gr) is then extracted twice with 2,516 liters and 1.680 liters of 70 percent ethanol containing 10 percent of ammonium acetate. Each extraction is accompanied by a stirring operation for about an hour. Two volumes of absolute ethanol containing 10 percent ammonium acetate are added to the clear extract obtained from the filtration. The precipitate is left to settle overnight and the clear natant is discarded, the precipitate then being collected by centrifugation. The precipitate is then washed with 95 percent ethanol and ethyl ether and dried. 7.527 gr of Fraction B are obtained. Fraction B 7.2 gr, equivalent to 1037 liters of urine, are dissolved in 720 ml of 0.05 M pH 7 phosphate buffer. The strongly colored brown solution is agitated for 10 minutes with 72 gr of DEAE-cellulose (diethylaminoethyl-cellulose) which had been previously washed with 0.5 N hydrochloric acid, then with 0.5N sodium hydroxide, then with distilled water, and finally with 0.05 M pH 7 phosphate buffer. The DEAE-cellulose is separated from the liquid by filtration through a Buchner filter and then washed twice with 720 ml 0.05 M pH 7 phosphate buffer. The mixed filtrates, now perfectly clear and of a pale yellow color, are acidified to pH 5.4 with glacial acetic acid and subsequently cooled to 4°–5° C. The chromatography on synthetic alumino-silicate gel is accomplished in the following manner: The synthetic alumino-silicate gel is put into a 3 × 20 cm column and washed with 1 N ammonia, then with 1 N acetic acid, and finally equilibrated with 0.05 M pH 5.4 acetate buffer. The chromatography is carried out in a refrigerated room at 4°–5° C. The clear liquid obtained after DEAE-cellulose treatment is percolated through the column and the outflow is discarded. The column is then washed with 0.05 M pH 5.4 acetate buffer until the $E280^{\mu}$ optic density is near to zero. The proteins adsorbed on the synthetic alumino-silicate gel are eluted with 40 percent ethanol containing 10 percent ammonium acetate and about 350 ml of eluate are collected. This almost colorless liquid is added with stirring to 2.5 volumes of ethanol chilled to 2°–4° C. to form a precipitate. The resulting precipitate is left to settle overnight at 2°–4° C. The clear natant is discarded and the precipitate is collected by centrifugation and is washed with absolute ethanol and then with ethyl ether and dried. Fraction c 290 mg is thereby obtained.

According to the method of extraction and purification, three other batches have been prepared. See Table 1.

TABLE 1

| Batch | Urine l | Fraction A mg/l | Fraction B mg/l | Fraction C mg/l |
|---|---|---|---|---|
| P-25 E32 | 1083 | 97.4 | 6.95 | 0.28 |
| P-25 E35 | 16,245 | 97.4 | 8.72 | 0.703 |
| P-25 E38 | 59,877 | 97.4 | 10.33 | 0.595 |
| E-26 E43 | 68,862 | 83.0 | 15.18 | 0.45 |

The biological characteristics of the above four groups are reported in Table 2.

um, and hence to ovulation, also HCG (chorionic gonadotropin) can be used as it has an action similar or equal to that of ICSH, as extracted either from human hypophyses or from post-menopausal urine.

For a further HMG purification, a filtration on Sephadex G 200 140–400 mesh has been carried out.

The Sephadex G 200 is suspended in distilled water and washed by decantation three or four times, with $H_2O$, thereby discarding the finer fractions. The Sephadex gel is put into a 107 × 0.9 cm column. The chromatography is carried out in a refrigerated chamber of 4°–6° C.

The $E280^{\mu}$ optic density of the outflow is measured with a Beckman DU spectrophotometer. The speed of the outflow is regulated at 1 ml per hour. The HMG is dissolved in $H_2O$. The filtration on the gel requires about 48 hours. After the $E280^{\mu}$ optic density has been determined, all the collected fractions are frozen and finally lyophilized.

The following is an example of purification of Fraction C by utilizing the chromatography on Sephadex G 200.

As starting material, the Fraction C of the Pergonal-26 E43 lot, as prepared from a pool of 68,862 liters of post-menopausal urine has been used (See Table 2).

60 mg of Fraction C are dissolved in 1 ml of $H_2O$, and the solution is put into the chromatographic column. The filtration on the gel is effected by distilled water. The outflow is regulated to 1 ml per hour. When the optic density $E280^{\mu}$ is above zero, the outflow is collected and amounted to 57.4 ml.

The different fractions of the outflow, after the $E280^{\mu}$ has been determined, are frozen and stored at −25° C before the lyophilization.

Fraction C chromatography of Pergonal-26 E43 on Sephadex G 200.

Optic density $E280^{\mu}$:

TABLE 2.—BIOLOGICAL ACTIVITY OF FRACTIONS A–C IN TERMS OF IRP-HMG

[Reference preparation used: Proposed International Standard of HMG (Pergonal-23)]

| | Mouse uterus test | | | | | Augmentation test | | | | | Ventral prost. wt. hypophysectomized rat test | | | | |
|---|---|---|---|---|---|---|---|---|---|---|---|---|---|---|---|
| | Design | N | λ | R.P. | F.L., P=0.95 | Design | N | λ | R.P. | F.L., P=0.95 | Design | N | λ | R.P. | F.L., P=0.95 |
| Fract. A: | | | | | | | | | | | | | | | |
| P-25 E32 | 2+2 | 20 | 0.10 | 0.64 | 0.50–0.86 | | | | | | | | | | |
| P-25 E35 | 2+2 | 20 | 0.10 | 0.64 | 0.50–0.86 | | | | | | | | | | |
| P-25 E38 | 2+2 | 20 | 0.10 | 0.64 | 0.50–0.86 | | | | | | | | | | |
| P-26 E43 | 2+2 | 20 | 0.11 | 0.76 | 0.58–0.97 | | | | | | | | | | |
| Fract. C: | | | | | | | | | | | | | | | |
| P-25 E32 | 2+2 | 20 | 0.12 | 74.5 | 54.4–130 | 2+2 | 20 | 0.08 | 466.8 | 389–557 | 2+2 | 20 | 0.46 | 91 | 31.7–1,088 |
| P-25 E35 | 2+2 | 20 | 0.13 | 27.7 | 21.7–45.1 | 2+2 | 20 | 0.1 | 138 | 94.2–238 | 2+2 | 20 | 0.28 | 44.6 | 24.6–101.4 |
| P-25 E38 | 2+2 | 20 | 0.14 | 35 | 22.8–60.3 | 2+2 | 20 | 0.20 | 207.6 | 138–618 | 2+2 | 20 | 0.23 | 35.2 | 25.6–58.5 |
| P-26 E43 | 2+2 | 20 | 0.13 | 55.5 | 37–80 | 2+2 | 20 | 0.08 | 264 | 216–330 | 2+2 | 20 | 0.17 | 69.6 | 46.5–111.6 |

As can be seen from Tables 1 and 2, the biological potency and the recovery of biological activity vary from batch to batch.

It will be noted, and as claimed, Fraction C has a high discriminating index between FSH and LH factors, that is Fraction C contains predominantly the FSH factor. Some experiments which have been made, have demonstrated that during the chromatography on the synthetic alumino-silicate gel a loss of LH occurs. It is apparently for this reason that there is a predominant effect of FSH in Fraction C. This point is very important because it has been shown that the FSH effect of human gonadotropin is that which is necessary for ovary stimulation, and that it can be obtained only either in the way pointed out by this invention, or by extracting it post-mortem from human hypophyses. As LH-acting gonadotropic factor, necessary to the transformation of the follicle into corpus lute-

| | |
|---|---|
| Biological Activity (mouse uterus) recovery: | 96% |
| Biological Activity (Augmentation test) recovery: | 88% |
| Protein recovery: | 100% |

In previous experiences it was ascertained that by using HMG chromatography on Sephadex G 75 and DEAE-Sephadex, most of the biological activity was concentrated in the first fractions of the outflow. For this reason, there were mixed Fractions 1 to 10 (31.6 ml of the outflow), Fractions 11 to 12 (16.9 ml of outflow), Fractions 13 to 15 (8.9 ml of outflow). These mixed fractions were lyophilized. Fraction 1–10 after lyophilization yields 17.5 mg of protein. Fraction 11–12 after lyophilization yields 39.3 mg of protein. Fraction 13–15 after lyophilization yields 3.2 mg of protein.

The biological activity of these fractions is reported in Table 3.

TABLE 3.—BIOLOGICAL ACTIVITY OF FRACTIONS OBTAINED WITH CHROMATOGRAPHY ON SEPHADEX G 200 IN TERMS OF IRP-HMG

[Reference preparation used: Pergonal-23]

| | Mouse uterus test | | | | | Augmentation test | | | | | Ventral prost. wt. hypophysectomized rat | | | | |
|---|---|---|---|---|---|---|---|---|---|---|---|---|---|---|---|
| Tested materials | Design | N | λ | R.P. | F.L., P=0.95 | Design | N | λ | R.P. | F.L., P=0.95 | Design | N | λ | R.P. | F.L., P=0.95 |
| Starting material P-26, E43C | 2+2 | 20 | 0.13 | 55.5 | 37–80 | 2+2 | 20 | 0.08 | 264 | 216–330 | 2+2 | 20 | 0.17 | 69.6 | 46.5–111.6 |
| Fract. 1–10 | 2+2 | 20 | 0.1 | 140.8 | 108–184 | 2+2 | 20 | 0.09 | 621 | 454–868 | 2+2 | 20 | 0.23 | 115.6 | 69.6–134 |
| Fract. 11–12 | 2+2 | 20 | 0.13 | 18.7 | 12.3–30 | 2+2 | 20 | 0.12 | 78 | 60.6–110.4 | 2+2 | 20 | 0.18 | 30 | 14–60.3 |

Fract. 13–15 inactive at dose levels used.

As shown in Table 3, the potency of Fraction 1–10, either by the mouse uterus test, or by the augmentation test, is about 2.5 times higher than that of the starting material.

The overall recovery (Fraction 1–10 and Fraction 11–12) of the biological activity is equal to 96 percent, as referred to the activity of the starting material.

74 percent of the biological activity of the starting material is concentrated in the first 31.6 ml of the outflow; whereas only 22 percent of the biological activity is found in Fraction 11–12, while Fraction 13–15 is completely inactive.

The characterization of the protein component of Fraction 1–10 as obtained by chromatography on Sephadex G 200 as described in the cited example, was obtained by means of immunoelectrophoresis according to the method described by Lunenfeld B. Isersky C. Shelesnyak M.C., J. Clin. Endocrinology & Metab. 22:55, 1962.

On the plate used for the immunoelectrophoresis, besides Fraction 1–10, also normal human serum and a less pure HMG Pergonal–23 having a gonadotropic total potency of 16 mg equivalent of I.R.P. were placed, in order to compare the electrophoretic mobility of the various protein fractions. The anti-serum used were as follows: 1° rabbit anti-serum, against total human serum protein; 2° rabbit anti-serum against HMG (Pergonal–23. The following are the results of the immunoelectrophoretic analyses.

Fraction 1–10 with the anti-serum of total human serum protein presents two precipitin lines in the albumin region, but the center of these lines does not correspond to that of albumin. There is a third hardly visible line, which perhaps coincides with the albumin line. Then there are two lines in the region of $\alpha_2$-, and one line in the region of $\beta$-globulins.

The same Fraction 1–10 with the Pergonal –23 anti-serum or Anti-Pergonal, gives two clear lines, whose centers are in the region between $\beta$- and $\alpha$-, and one in region $\beta$ and finally one line in region $\alpha_1$, whereas Pergonal–23, i.e. the less pure HMG, gives 8 precipitin lines.

What is claimed is:

1. A process for the preparation of a urinary gonadotropic hormone preparation containing FSH and LH hormones, the ratio of FSH:LH being between 3:1 and 6:1 which comprises:

a. acidifying menopausal or post-menopausal human urine to a pH between 4.0 and 4.5;
b. adding thereto an aqueous suspension of activated kaolin present in amounts of 10–30 percent by weight of said suspension;
c. agitating the resulting mixture;
d. separating the activated kaolin adsorbent from the mixture;
e. washing the separated activated kaolin adsorbent with acidulated water at a pH of about 4.0–4.8;
f. eluting the separated activated adsorbent with an aqueous ammonia solution so as to obtain an eluate at a pH between 11.0 and 11.3;
g. adjusting the pH of the eluate to about 8.3 to 8.7 thereby forming a precipitate;
h. separating the precipitate of (g) from the eluate to provide a relatively clear liquid;
i. acidifying said relatively clear liquid to a pH between about 5.0 and 5.5;
j. adding to the acidified clear liquid of (i) acetone in amounts sufficient to form a precipitate;
k. separating the precipitate of (j) from the acetone treated clear liquid;
l. washing the precipitate with ethanol and ether;
m. extracting the washed precipitate with about 70 percent ethanol containing about 10 percent ammonium acetate to obtain a relatively clear extract;
n. adding to the extract of (m) absolute ethanol containing about 10 percent ammonium acetate to produce a precipitate;
o. dissolving the precipitate from (n) with a 0.05 M phosphate buffer at a pH of about 7;
p. agitating the dissolved precipitate from (o) with diethylaminoethyl cellulose and thereafter separating said diethylaminoethyl cellulose therefrom to form a relatively clear filtrate;
q. acidifying the relatively clear filtrate from (p) to a pH of about 5.4;
r. passing said acidified relatively clear filtrate through a column containing synthetic alumino-silicate gel equilibrated with 0.05 M acetate buffer at a pH of about 5.4;
s. eluting the column with about 40 percent ethanol containing about 10 percent ammonium acetate to provide an eluate;
t. adding to the eluate of (s) about 95 percent ethanol in amounts sufficient to form a precipitate; and
u. washing the precipitate from (t) to provide said urinary gonadotropic hormone preparation.

2. The process of claim 1 which includes:

v. dissolving the precipitate from (u) in water;
w. passing the dissolved precipitate from (v) at a temperature of 4.5° C. through a column containing small grains of a hydrophilic, insoluble material made by cross-linking polysaccharide dextran wherein the dextran chains are cross-linked to give a three dimensional network and the functional ionic groups are attached to the glucose units of the polysaccharide chains by ether linkages; and
x. collecting the first fractions passing through said column to provide a further purified urinary gonadotropic hormone preparation.

3. A pituitary gonadotropic hormone preparation made in accordance with claim 1 and characterized by the following biological activities;

Total Gonadotropic Activity (mouse uterus test)
1 mg = 141 mg equivalent of I.R.P.
FSH (augmentation test in rats)
1 mg = 621 equivalents of I.R.P.
LH (central prostrate wt. hypophysectomized rats)
1 mg = 115 mg equivalent I.R.P.

4. A method for the preparation of a urinary gonadotropic hormone preparation containing FSH and LH hormones, the ratio of FSH:LH being between 3:1 and 6:1 which comprises:

a. acidifying menopausal or post-menopausal human urine to a pH between 4.0 and 4.5;
b. adding thereto an aqueous suspension of activated kaolin present in amounts of 10–30 percent by weight of said suspension;
c. agitating the resulting mixture for a period of about 1 hour;
d. separating the said activated kaolin adsorbent from the mixture by settling;
e. discarding the supernatant liquid;
f. centrifuging the separated activated kaolin adsorbent;
g. washing the centrifuged activated kaolin adsorbent twice with acidulated water at a pH of about 4.5;
h. eluting the washed activated kaolin adsorbent twice with 1 M aqueous ammonia solution so as to obtain an eluate at a pH between 11.0 and 11.3;
i. mixing the eluates from (h);
j. adjusting the pH of the mixed eluates to about 8.5 thereby forming a precipitate;
k. separating the precipitate of (j) from the mixed eluates to provide a relatively clear liquid;
l. acidifying said relatively clear liquid to a pH of about 5.0 to 5.5;
m. adding to the acidified clear liquid of (l) about 2 volumes of acetone and maintaining the mixture overnight to form a precipitate;
n. separating the precipitate of (l) from the acetone treated clear liquid;
o. drying the precipitate;
p. washing the precipitate with about 95 percent ethanol and ether;
q. extracting the washed precipitate with about 70 percent ethanol containing about 10 percent ammonium acetate to obtain a relatively clear extract;
r. adding to the extract of (q) absolute ethanol containing about 10 percent ammonium acetate to produce a precipitate;

s. dissolving the precipitate from (r) with a 0.05 M phosphate buffer at a pH of about 7;
t. stirring the dissolved precipitate from (s) with diethylaminoethyl cellulose and thereafter separating said diethylaminoethyl cellulose therefrom to form a relatively clear filtrate;
u. acidifying the relatively clear filtrate from (t) to pH 5.4;
v. passing said acidified relatively clear filtrate through a column containing synthetic alumino-silicate gel equilibrated with 0.05 M acetate buffer at a pH of about 5.4;
w. eluting the column with 40 percent ethanol containing 10 percent ammonium acetate to provide an eluate;
x. adding to the eluate of (w) about 95 percent ethanol in amounts sufficient to form a precipitate; and
y. washing the precipitate from (x) to provide said urinary gonadotropic hormone preparation.

5. The process of claim 4 wherein the acid used for acidification is acetic acid.

6. The process of claim 4 wherein the kaolin is previously washed with about normal HCl and washed with water.

7. The process of claim 4 wherein the diethylaminoethyl cellulose used is previously treated with 0.5 N HCl, then with 0.5 N sodium hydroxide and finally with 0.05 M phosphate buffer of pH 7.0.

8. The process of claim 4 wherein the synthetic alumino-silicate gel has a granular size passing through 56 mesh and retained by a 76 mesh sieve and which has been previously washed with acetic acid, with water and dried.

* * * * *